United States Patent
Emert et al.

(10) Patent No.: US 9,219,384 B2
(45) Date of Patent: Dec. 22, 2015

(54) MODULAR POWER SKID THAT CAN MEET TWO OR MORE DIFFERENT DATACENTER TIER RATINGS

(71) Applicant: Rosendin Electric, Inc., San Jose, CA (US)

(72) Inventors: Steve Emert, Hayward, CA (US); John Manual Loera, San Jose, CA (US)

(73) Assignee: Rosendin Electric, Inc., San Jose, CA (US)

( * ) Notice: Subject to any disclaimer, the term of this patent is extended or adjusted under 35 U.S.C. 154(b) by 164 days.

(21) Appl. No.: 13/959,646

(22) Filed: Aug. 5, 2013

(65) Prior Publication Data

US 2015/0036254 A1   Feb. 5, 2015

(51) Int. Cl.
  *H02H 3/08*  (2006.01)
  *H02H 9/02*  (2006.01)
  *H02J 9/06*  (2006.01)
  *H02H 7/26*  (2006.01)

(52) U.S. Cl.
  CPC .. *H02J 9/06* (2013.01); *H02H 7/266* (2013.01)

(58) Field of Classification Search
  USPC ........................................... 361/93.1
  See application file for complete search history.

(56) References Cited

U.S. PATENT DOCUMENTS

| | | | |
|---|---|---|---|
| 6,892,145 B2 * | 5/2005 | Topka et al. | 702/62 |
| 2005/0200205 A1 * | 9/2005 | Winn et al. | 307/64 |
| 2011/0170223 A1 * | 7/2011 | DiMarco et al. | 361/94 |
| 2013/0024039 A1 * | 1/2013 | Gotz et al. | 700/292 |
| 2013/0293017 A1 * | 11/2013 | Englert et al. | 307/65 |
| 2015/0051749 A1 * | 2/2015 | Hancock et al. | 700/295 |

* cited by examiner

*Primary Examiner* — Dharti Patel
(74) *Attorney, Agent, or Firm* — Rutan & Tucker, LLP (57) ABSTRACT

A method, apparatus, and system in which one or more instances of a same modular power skid are assembled with main and backup uninterruptible power supplies and multiple power distribution cabinets arranged in different electrical configurations and control sequences to meet two or more different datacenter tier ratings with a built-in fault tolerance via a programmable logic controller housed in one of the cabinets on the skid as well as built-in autonomous responses to equipment failures programmed into the programmable logic controller.

16 Claims, 8 Drawing Sheets

(N) TIER I

FIGURE 3

(N+1) TIER III

Connecting the programmable logic controller has an input-output rack that has control wires to each breaker in the system as well as each major component including a main and backup interruptible power supplies, programming the programmable logic controller to monitor a status of each of these individual components in the electrical distribution system in order to control any operations and give fault tolerance to the electrical distribution system by opening and closing individual circuit breakers as well as starting up or shutting down external AC power diesel generators connecting to cabinets on the power skid, where a same instance of the modular power skid is able to work across multiple tier ratings via control wiring connected to each component for monitoring equipment failure and operational status and the programming in the programmable logic controller understanding the multiple tier ratings and which fault tolerance scenario to apply
612            depending on the tier rating installation.

Programming the programmable logic controller to monitor statuses of any individual components including the circuit breakers, the uninterruptible power supplies, the external AC power diesel generators, a main power from a utility power grid, then the programmable logic controller knows exactly both when and where a fault is occurring on including whether on an A-side/primary power to the electrical loads or a B-side/redundant power to the electrical loads of the datacenter, where the programmable logic controller talks to any intelligence in the uninterruptible power supplies to find out the status of the uninterruptible power supply, where the programmable logic controller monitors the 1) breakers' status of each AC power diesel generator, 2) breakers' status of the utility power grid input supply breaker to the datacenter and 3) breakers' status of each of any
614    individual local breakers throughout the electrical distribution system.

Electrically coupling a reserve AC power generator into a first switchboard cabinet via a first circuit breaker on a first instance of the power distribution skid. A main AC power from the utility power grid transformer electrically couples via a tap splitter into a second switchboard cabinet via a second circuit breaker on a first instance of the power distribution skid. Each universal power supply on the first instance of the power distribution skid has a battery configured to supply at least 5 minutes of critical power battery at a full load of 750 Kilowatts, where a main AC power generator electrically couples into a third switchboard cabinet via a third circuit breaker on a second instance of the power distribution skid. The main AC power from the utility power grid transformer electrically couples via the tap splitter into a fourth switchboard cabinet via a fourth circuit breaker on a second instance of the power distribution skid. Each universal power supply on the second instance of the power distribution skid has a battery configured to supply at least five minutes of critical power battery at a full load of 750 Kilowatts. The data center has electrical loads that receive tiered III power supplied to those loads in
616                          each data center hall.

Electrically coupling a first AC power generator into a first switchboard cabinet via a first circuit breaker on a first instance of the power distribution skid. A main AC power from the utility power grid transformer electrically couples directly into a second switchboard cabinet via a second circuit breaker on a first instance of the power distribution skid. Each universal power supply on the first instance of the power distribution skid has a battery configured to supply at least five minutes of critical power battery at a full load of 750 Kilowatts. A second AC power generator electrically couples into a third switchboard cabinet via a third circuit breaker on a second instance of the power distribution skid. The main AC power from the utility power grid transformer electrically couples directly into a fourth switchboard cabinet via a fourth circuit breaker on a second instance of the power distribution skid. Each universal power supply on the second instance of the power distribution skid has a battery configured to supply at least 5 minutes of critical power battery at a full load of 750 Kilowatts, where the data center has electrical loads that receive tiered IV power supplied to those loads in each data center hall.
618

Programming the programmable logic controller with at least the following fault tolerance and equipment failure scenarios into its control logic to govern opening or closing circuit breakers in the cabinets of the multiple instances of the modular power skids, including 1) an automatic transfer sequence for a loss of utility grid power to the primary AC generator connected to either instance of the modular power skid; 2) an automatic transfer sequence for a loss of utility grid power to the reserve generator connected to a first instance of the modular power skid when a primary generator connected to the first instance of the modular power skid fails; 3) an automatic transfer sequence for a loss of utility power grid power connected to a first instance of the modular power skid over to the reserve generator connected to the first instance of the modular power skid when a primary generator connected to the first instance of the modular power skid is not available; 4) an automatic transfer sequence for a loss of a primary AC generator power connected to the first instance of the modular power skid over to the reserve AC generator connected to the first instance of the modular power skid when the primary generator fails while running; and 5) an automatic transfer sequence to the utility grid power feed connected to the first instance of the modular power skid when the reserve generator connected to the first instance of the modular power skid fails while running.
620

( End )

Figure 6C

MODULAR POWER SKID THAT CAN MEET TWO OR MORE DIFFERENT DATACENTER TIER RATINGS

FIELD OF THE INVENTION

Embodiments of the invention generally relate to a modular power skid.

More particularly, an aspect of an embodiment of the invention relates to a modular power skid with control sequences to meet two or more different datacenter tier ratings.

BACKGROUND OF THE INVENTION

Previously, modular power skids featured custom designs for each tier level application. One electrical room could deploy multiple skid lineups where each modular power skid was unique; for example, three different skid designs for deployment in the same electrical room. The present design reduces the number of skids deployed to two identical modular power skids while ensuring that all tier center ratings may be met in a single unit. The modular power skid features significantly greater operational robustness and greater fault recovery capabilities.

SUMMARY OF THE INVENTION

Disclosed herein are one or more instances of a same modular power skid assembled with main and backup uninterruptible power supplies and multiple power distribution cabinets arranged in different electrical configurations and control sequences to meet two or more different datacenter tier ratings with a built-in fault tolerance via a programmable logic controller housed in one of the cabinets on the skid as well as built-in autonomous responses to equipment failures programmed into the programmable logic controller.

BRIEF DESCRIPTION OF THE DRAWINGS

The drawings refer to embodiments of the invention in which:

FIGS. 6A-C illustrate a flow diagram of an embodiment of constructing a single integrated platform assembled with different electrical cabinets and components mounted on the framework of the integrated platform that can be operated and arranged to meet multiple datacenter tier ratings.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of memory columns in a group of memory columns, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references, such as first driver, may be made. However, the specific numeric reference should not be interpreted as a literal sequential order but rather interpreted as a first driver is different than a second driver. Thus, the specific details set forth are merely exemplary. The specific details may be varied from and still be contemplated to be within the spirit and scope of the present invention. The term coupled is defined as meaning connected either directly to the component or indirectly to the component through another component.

In general, the fault tolerance of a modular power skid isolates the fault so that the rest of the system continues to operate. The design allows a reduction in the number of different types of skids deployed over multiple client redundant requirements to a single type and design of an electrical power distribution skid with redundant UPS and a PLC for fault tolerance control as well as autonomous responses to equipment failures programmed into the PLC. One or more instances of a same modular power skid are assembled with main and backup uninterruptible power supplies and multiple power distribution cabinets arranged in different electrical configurations and control sequences to meet two or more different datacenter tier ratings with a built-in fault tolerance via a programmable logic controller housed in one of the cabinets on the skid as well as built-in autonomous responses to equipment failures programmed into the programmable logic controller.

Figure 1:
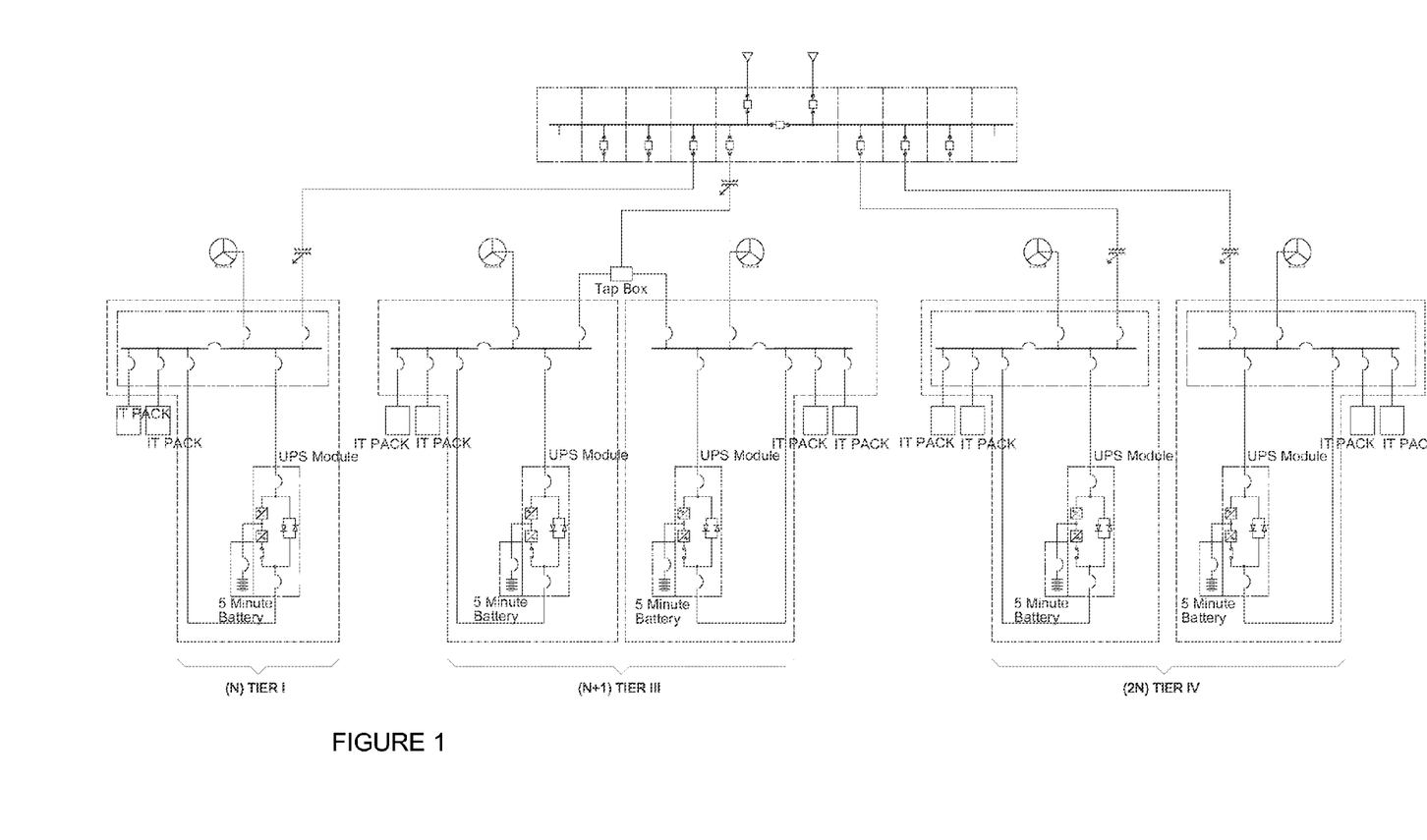
FIG. 1 illustrates a single line diagram of an embodiment of a modular power skid assembled with main and backup uninterruptible power supplies and multiple power distribution cabinets arranged in different electrical configurations and control sequences to meet two or more different datacenter tier ratings with a built-in fault tolerance via a programmable logic controller housed in one of the cabinets on the skid as well as built-in autonomous responses to equipment failures programmed into the programmable logic controller.

FIG. 1 illustrates a single line diagram of an embodiment of a modular power skid assembled with main and backup uninterruptible power supplies and multiple power distribution cabinets arranged in different electrical configurations and control sequences to meet two or more different data center tier ratings with a built-in fault tolerance via a programmable logic controller housed in one of the cabinets on the skid as well as built-in autonomous responses to equipment failures programmed into the programmable logic controller.

The programmable logic controller (PLC) has an input output rack with control wires that connect to each breaker in the system as well as each major component including the main and backup interruptible power supplies. The programmable logic controller monitors the status of each of these individual components in the system in order to control the operations and give fault tolerance to the system by opening and closing individual circuit breakers and starting up or shutting down external diesel generators in the system. Because the programmable logic controller monitors the individual components, circuit breakers, uninterruptible power supplies, AC power diesel generators, and statuses, the programmable logic controller knows exactly both when and where a fault is occurring, i.e., whether on an A-side/primary power to the electrical loads or a B-side/redundant power to the electrical loads of the system. The programmable logic controller talks to the intelligence in the uninterruptible power supply to find out the status of the uninterruptible power supply. The programmable logic controller monitors the 1) breakers' status of the AC power diesel generator, 2) breakers' status of the utility power grid input supply to system and 3) breakers' status of each of the individual local breakers throughout the system going to individual loads and going into and out of the uninterruptible power supplies.

The programmable logic controller has equipment fault scenarios programmed into the control logic along with detailed actions to be taken under various equipment failure scenarios. The programmable logic controller also has fault tolerance scenarios programmed into the control logic of the programmable logic controller indicating and controlling which circuit breakers should open to isolate faults in a fault tolerant scenario. The programmable logic controller has a very comprehensive fault scenario scheme to cover isolation and response as to individual circuit breakers for individual loads occurring, along with the more common opening closing of the diesel generator breakers and opening and closing of the circuit breakers for power coming from the utility power grid.

The fault scenarios programmed into the programmable logic controller set up interlocks between individual breakers such that when a fault occurs on a specific breaker then the control logic in the programmable logic controller knows to ensure the open or close state of a specific number of other breakers related to where the fault is occurring.

A single modular power skid design can be used in four of the Uptime Institutes' datacenter tier ratings scenarios. Those tier ratings are: (1) Tier I N redundant; (2) Tier II 2N redundant critical components; (3) Tier III 2N redundant, concurrently maintainable; and (4) Tier IV 2N redundant, concurrently maintainable, fault tolerant.

Each modular power skid is identical, so each data center will vary in the number of skids deployed and how the skids are tied into the facilities' electrical distribution system. The programmable logic controller in one of the seven cabinets on the modular power skid has a fault tolerance via programmable logic controller-hardened system. The same instance of a modular power skid is able to work across multiple tier ratings with control wiring connected to each component for monitoring equipment failure and operational status. The data center various tier requirements may be satisfied through combinations of one or more instances of the modular power distribution skid, one or more emergency AC power diesel generators, and an amount of distinct and independent number of power feed inputs from the utility power grid, all to make sure that power is supplied without interruption to the critical loads in the data center.

Figure 2:
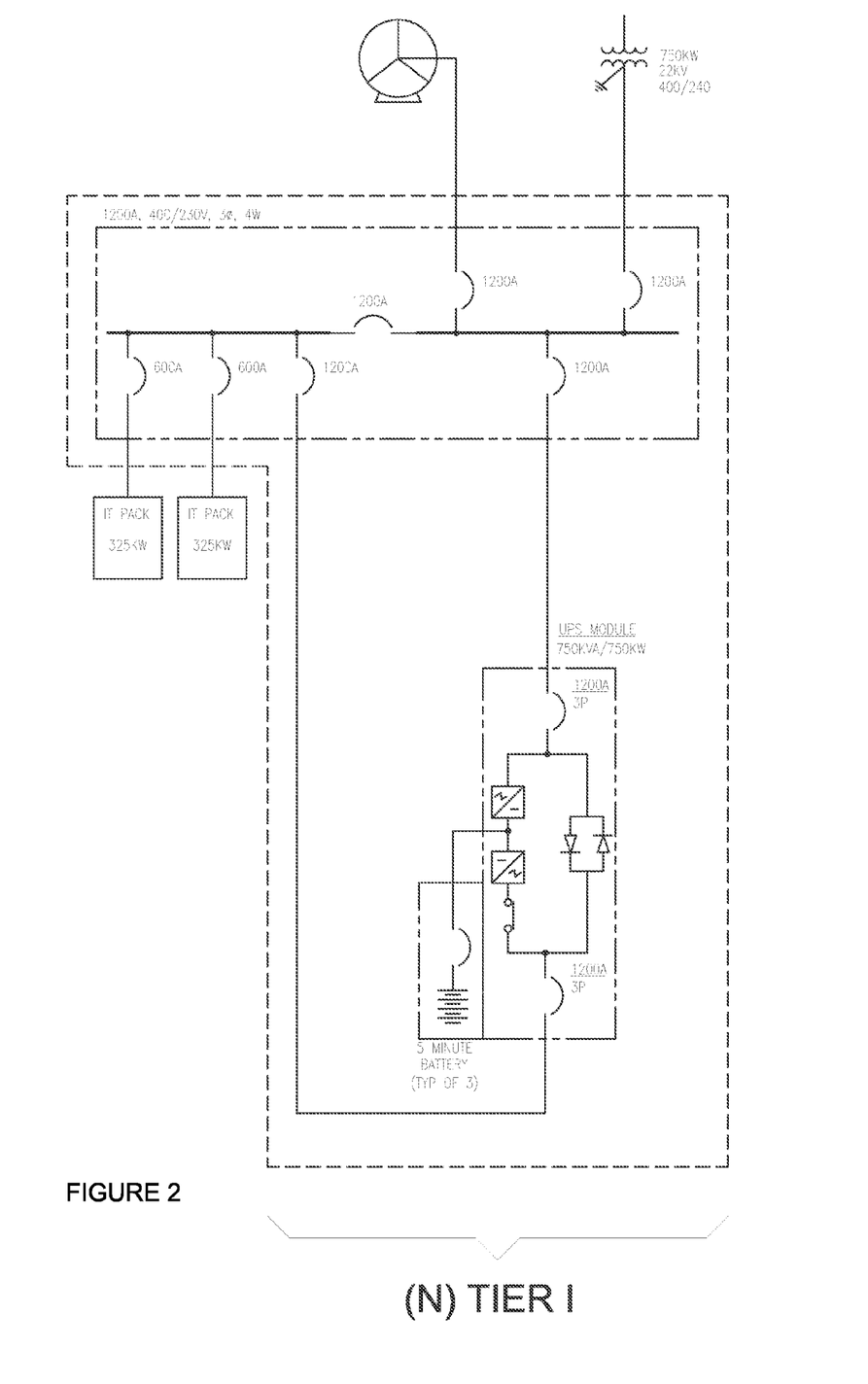
FIG. 2 illustrates a close-up of a single line diagram of an embodiment of a modular power skid assembled with main and backup uninterruptible power supplies and multiple power distribution cabinets arranged in a tier I datacenter rating for electrical configurations and control sequences.
Figure 3:
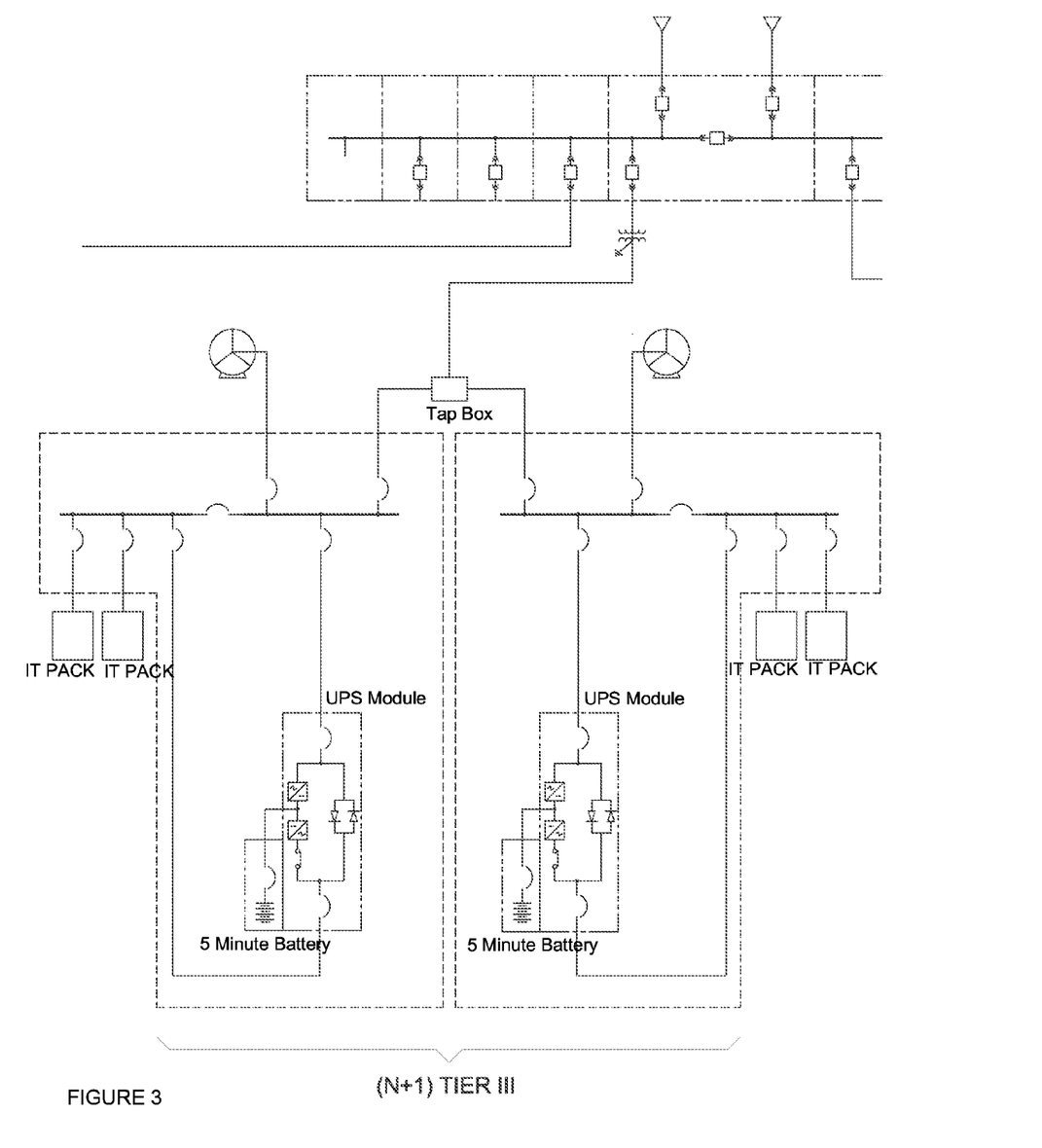
FIG. 3 illustrates a close-up of a single line diagram of an embodiment of a modular power skid assembled with main and backup uninterruptible power supplies and multiple power distribution cabinets arranged in a tier III datacenter rating for electrical configurations and control sequences.
Figure 4:
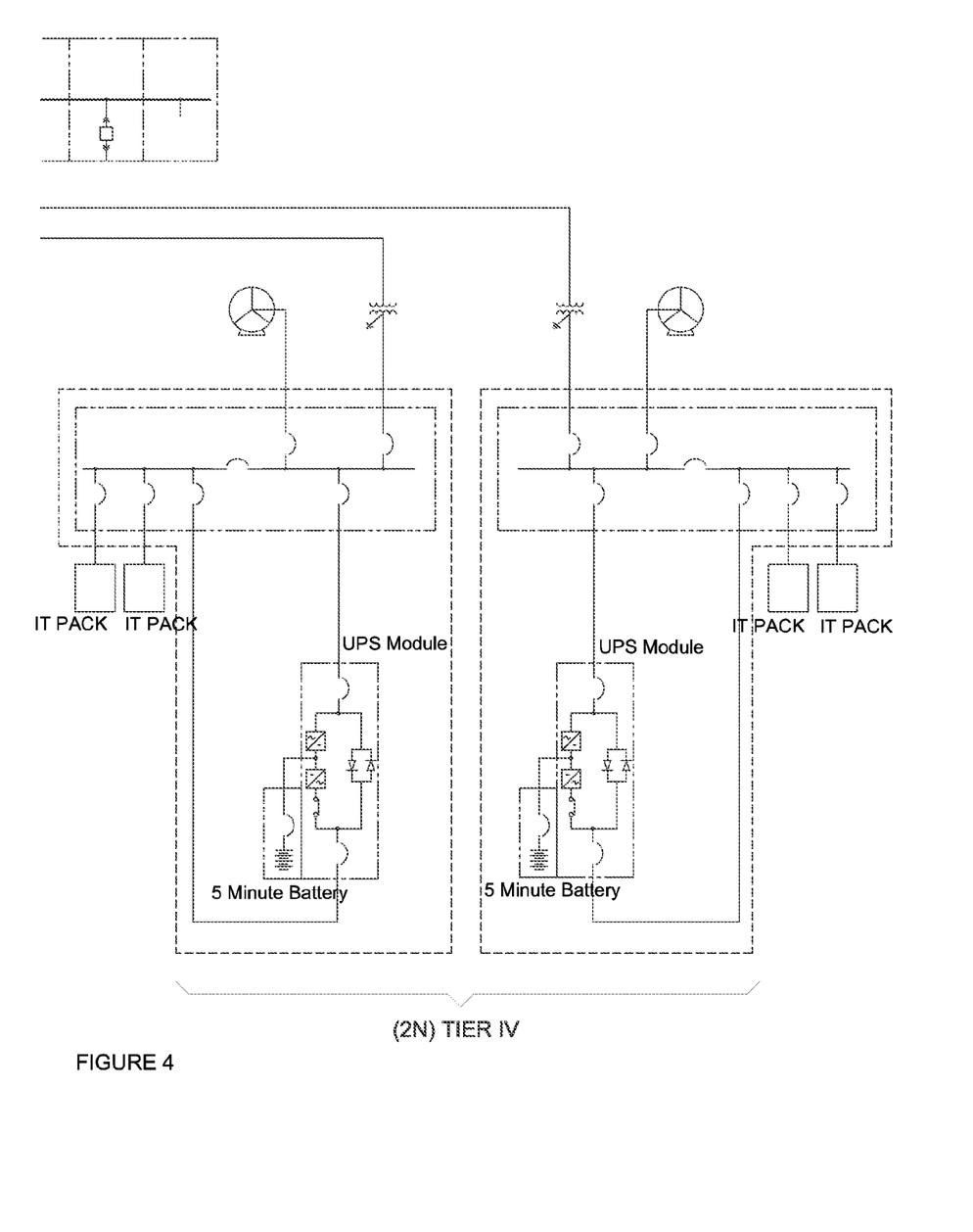
FIG. 4 illustrates a close-up of a single line diagram of an embodiment of a modular power skid assembled with main and backup uninterruptible power supplies and multiple power distribution cabinets arranged in a tier IV datacenter rating for electrical configurations and control sequences.

Referring to FIG. 1, in a landscape view of the drawing on the upper left-hand side a reserve generator/swing generator/shared generator is shown. FIGS. 2, 3 and 4 show a more detailed view of a Tier I, Tier III or Tier IV implementation of the power distribution skids, diesel generators, and utility power feeds to satisfy the Tier I, Tier III, or Tier IV requirements. The reserve generator electrically couples into one of the cabinets on the power distribution skid called the switchboard cabinet. Each power distribution skid has such a switchboard cabinet so that a single reserve diesel generator may electrically connect to multiple data center halls in a data center facility. Each data center facility may have, for example, 2-20 data center halls that each have electrical loads that need to have tiered power supplied to those loads in each data center hall.

The switchboard cabinet housing the connection to this shared diesel generator connection also houses the programmable logic controller. The cabinet housing has a power supply input from the utility power grid as a primary source of power and to sense when a loss of utility power occurs. Utility power comes in through the center of the single line diagram in FIG. 1 through a 2500 kVA transformer and then through a 3000 amp breaker labeled XSW1 into a tap power splitter. The tap power splitter sends utility AC power to both the main/A power side and redundant/B power side. The A side shows the circuit breakers going to the mechanical loads including the building's HVAC loads on the right side of the power distribution skid with its main and backup uninterruptible power supplies. The B side shows the circuit breakers going to the critical power computing equipment loads in the data center on the left side of the power distribution skid with its main and backup uninterruptible power supplies. Each circuit breaker has control wires to monitor its open/closed status as well as control wires for the programmable logic controller to remotely override a circuit breaker to open. Each side, A and B, has its own diesel generator connecting into that side, its own power distribution skid with its main and backup uninterruptible power supplies, and a utility power AC power feed from the common tap power feed splitter in the Tier II and Tier III implementation. The B side is set up similar to the A side of this power supply and distribution scheme to the loads in a data hall of the data center facility that has multiple data halls with electrical loads.

FIG. 1 shows all three of a Tier I, Tier III, and Tier IV implementation of the power distribution skid(s), emergency power diesel generators, and AC power feeds from the utility power grid. In Tier I, a single generator and a single utility power grid feed go into the power distribution skid and then the power distribution skid feeds the power from either of the utility power grid or the emergency diesel generator through itself into the power distribution units on the left-hand side going to the electrical components/loads in a data hall of the data center.

The tier III scheme shown in the middle of FIG. 1 is a close-up version of FIG. 3.

The tier IV implementation has two dedicated diesel generators, each dedicated diesel generator connects next to its own modular power distribution skid, and each modular power skid also has its own power feed from the utility power grid. Thus, each electrical load in a data center hall under this Tier IV scheme has two sets of primary and backup redundant power going to that load in the data center hall of the data center facility.

The control wires from the I/O rack of the programmable logic controller are connected to detect conditions as well as cause operations/change of state for the component if they do not happen internally for that component. The programmable logic controller has at least the following example fault tolerance and equipment failure scenarios programmed into its control logic: an automatic transfer sequence for a loss of utility grid power to the primary generator; an automatic transfer sequence for a loss of utility grid power to the reserve generator when a primary generator fails; an automatic transfer sequence for a loss of utility power grid power to the reserve generator when a primary generator is not available; an automatic transfers sequence for a loss of a primary generator power over to the reserve generator when the primary generator fails while running; an automatic transfer sequence to the utility grid power feed when the reserve generator fails while running; an automatic transfer sequence to the utility grid power feed when the primary generator fails while running and the reserve generator is not available; an automatic transfer sequence to the primary generator when the reserve generator fails while running and no utility grid power feed is available; an automatic return to the utility grid power feed from the primary generator (open transition or closed transition) when the utility grid power feed is restored; an automatic return to the utility grid power feed from the reserve generator (open transition or closed transition) when the utility grid power feed is restored; manually initiated return to utility grid power feed from the primary generator (open transition or closed transition) when the utility grid power feed is restored; and grid power feed from the reserve generator (open transition or closed transition) when the utility grid power feed is restored.

Additional examples include: lockout relay operations when faults occur on utility power grid feed, when a bus fault occurs between the tie circuit breakers between the A-side and B-side and the main utility grid circuit breaker feeding the system; lockout relay operations when a bus fault occurs on the 'A' side bus fault between the mechanical loads and the tie circuit breakers for the A side; lockout relay operations when a bus fault occurs on the 'B' side bus fault between the mechanical loads and the tie circuit breakers for the 'B' side; lockout relay operations when a bus fault occurs on an individual mechanical load for the A side; lockout relay operations when a bus fault occurs on an individual mechanical load for the B side; lockout relay operations when an electrical fault, such as a short circuit, occurs while power supply for the system is coming from the primary generator and the reserve generator is available; and lockout relay operations when an electrical occurs while power supply for the system is coming from the primary generator and the reserve generator is not available.

Additional examples include: control operations and transfer sequences for when a circuit breaker fails to open (FTO) or fails to close (FTC), where individual scenarios exists for the primary generator breaker, reserve generator breaker, the utility power grid feed breaker, as well as other monitored individual breakers in the system.

The programmable logic controller control logic also has failure transfer sequences programmed for when a loss of communication occurs between switchboards, when a loss of the master programmable logic controller occurs, when a loss of the slave programmable logic controller and the master programmable logic controller is not working or unavailable, when a loss of DC control power bus occurs, and when a loss of AC control power bus occurs.

Some example transfer sequences for a loss of a power source are described herewith.

For automatic transfers with a loss of utility grid power, initial conditions include: the XSW1 utility grid power breaker is closed, the XBG primary diesel generator breaker is open, the XAG redundant diesel generator breaker is open, and tie breakers XAT and XBT are closed, which supply utility grid power to the A-side and B-side, respectively.

In a first example, power generation shifts to the primary generator transfer sequence. The utility voltage relay in a cabinet on the power distribution skid senses a loss of utility grid power. The system waits for the transient effects of the loss of power to pass. Should the utility grid power failure condition return to normal before the time delay expires, no action will be taken. If not, a loss of utility alarm is generated and the following occurs. The XSW1 utility grid power breaker is opened. The primary and reserve generator start relays are de-energized to start the diesel generators. When the primary generator voltage relay senses a nominal source voltage for that generator, then the XBG primary generator breaker is closed. As a result, the system is operating on primary generator power. The XSW1 utility breaker is open. The XBG primary generator breaker is closed. The XAG redundant generator breaker is open. The system will monitor for return of utility power or loss of primary generator power.

In a second example, power generation shifts to the reserve generator with a primary generator failure. The initial conditions are the same as above. The transfer sequence is the same as above, except when the primary generator voltage relay does not sense a nominal source voltage for the primary generator, then the programmable logic controller causes the primary generator start signal to be dropped and stops the generator, and ensures that the primary generator's circuit breaker is open. The reserve generator voltage relay senses for a nominal source voltage for the reserve generator and if present, then the XAG redundant generator breaker is closed.

For lockout relay operations, two '86' lock-out relays are provide in each switchboard. One lockout trips for faults internal to the switchboard and the other for faults external to the switchboard. This is determined by examining which breakers are closed at the moment of the fault and which breakers have tripped. To reset the fault condition after determining and correcting the fault condition, (1) place breaker control switches in local mode; (2) turn the transfer control switches to manual mode; (3) press the bell alarm trigger back in on the tripped breaker; (4) reset the tripped lock-out relay; (5) place breaker control switches in remote mode; and (6) turn the transfer control switches from manual back to auto mode.

The following describes the transfer sequences for transfer operations after a breaker fail to open (FTO) or fail to close (FTC) event has occurred. If an FTO or FTC event occurs during a manually imitated or non-automatic system operation, the system will stop all operations.

In an example of transfer to a primary generator after FTO, initial conditions for transfer to a primary generator include: the XSW1 utility breaker is closed, the XBG primary generator breaker is open, the XAG redundant generator breaker is open, the tie breakers XAT and XBT are closed, the TSR-A auto/remote/manual switch in is in the auto position.

The transfer sequence is as follows. The utility voltage relay senses a loss of source (27, 47, or 59). The system waits for the loss delay to pass. Should the utility failure condition return to normal before the time delay expires, no action will be taken. The loss of utility alarm is generated. The XSW1 utility breaker is opened. The primary and reserve generator start relays are de-energized to start the generators. The primary generator voltage relay senses a nominal source (27, 47, 59, and 81). The system waits for the ready to load delay to pass. The system waits for the open transition delay to pass. The system detects the XSW1 utility FTO. The system will generate an FTO alarm. Both tie breakers XAT and XBT are opened and locked out. The XBG primary generator breaker is closed. The XAG redundant generator breaker is closed. Thus, the system status is as follows. The system is operating on primary and redundant generator power. The XSW1 utility breaker is commanded to open. The XBG primary generator breaker is closed. The XAG redundant generator breaker is closed. The system will remain on generator power until the alarms are cleared. Once cleared, the system will then monitor for return of utility power or loss of primary generator power.

In an example of transfer to a primary generator after FTC, the initial conditions are the same as above. The transfer sequence is the same, except the XBG primary generator breaker is closed, the system detects the XBA primary generator breaker FTC, the system will generate a FTC alarm, and the XBG primary generator breaker is opened and locked out. The system status will then be the following. The system is operating on redundant generator power. The XSW1 utility breaker is open. The XBG primary generator breaker is closed. The XAG redundant generator breaker is closed. The system will remain on generator power until the alarms are cleared. Once cleared, the system will then monitor for return of utility power or loss of primary generator power.

The following describes example transfer sequences for transfer operations after a PLC, DC Bus or AC bus failure. If there is a loss of communication between switchboards, each switchboard PLC will monitor communication to the other PLC. Upon loss of communications each PLC will switch to standalone mode. A loss of communication alarm will be generated. Upon loss of utility, both switchboards will transfer to generator power. The XSWA switchboard will transfer to the reserve generator. The XSWB switchboard will transfer to the primary generator. If there is a loss of the master PLC, the slave PLC shall assume master PLC status. A loss of PLC alarm will be generated. If there is a loss of the slave PLC, a service alarm for the slave PLC will be generated. If there is loss of the DC control power bus, the system will go to single side mode. All power will be swung to the 'good' side and the 'bad' side de-energized. If there is a loss of the AC control power bus, the system will go to single side mode. All power should be swung to the good side and the bad side de-energized.

During normal operation, the utility power grid provides AC power through the main uninterruptible power supply inverter to power the electrical loads in the A-side and also provides AC power through the backup uninterruptible power supply inverter to power the electrical loads in the B-side. In the event of a loss of utility power from the grid, the critical load power will be continually supplied to the uninterruptible power supply on a momentary basis via the uninterruptible power supply while the emergency power supplies of a diesel generator come online. The system ensures that for a number of fault conditions, power is supplied by one of the emergency power, uninterruptible power supply power, or utility grid power without interruption to the critical loads in the data center. Control over the circuit breakers and operation of the uninterruptible power supplies and emergency diesel generators makes sure the supplied power occurs without interruption.

Figure 5:
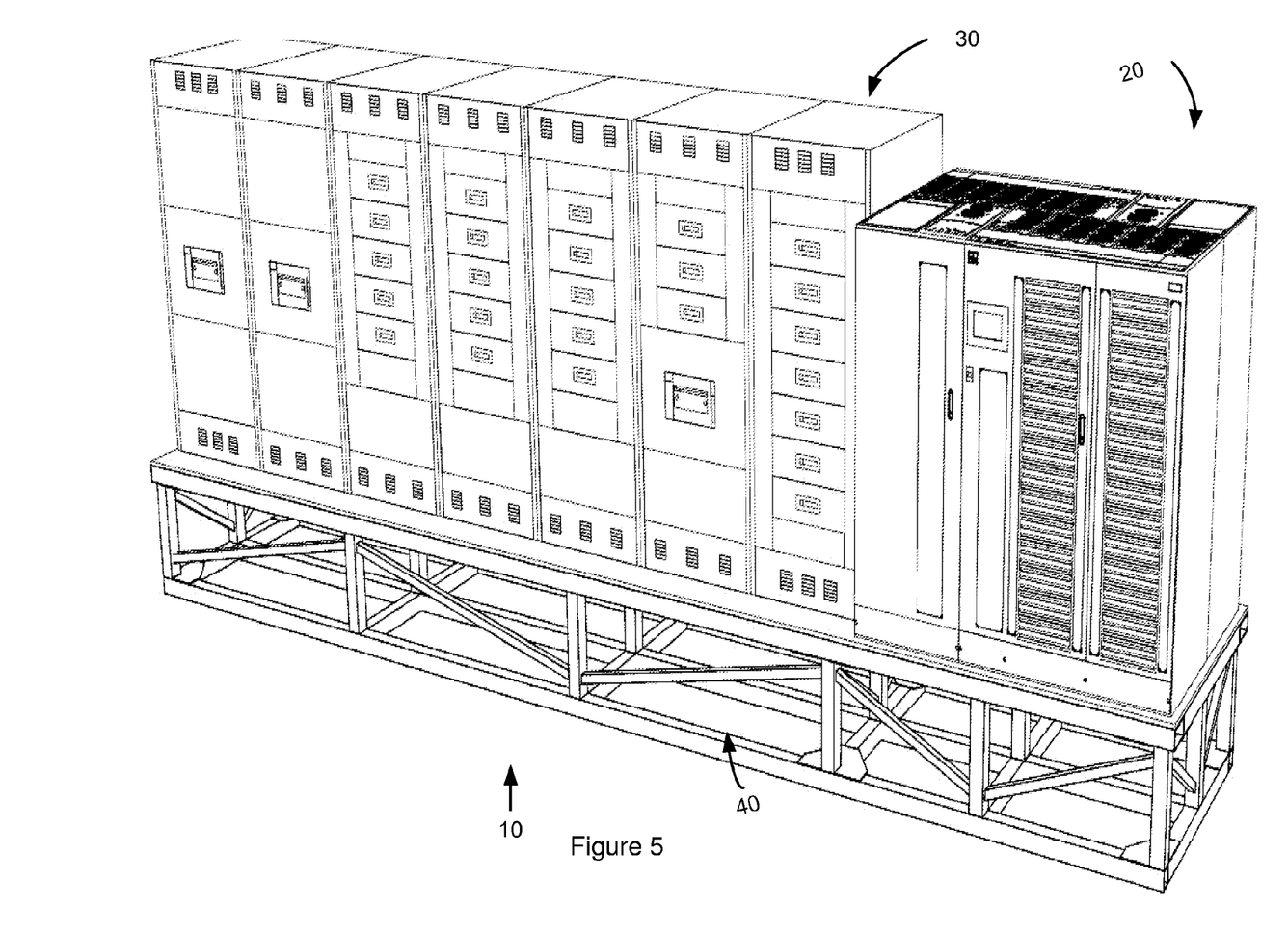
FIG. 5 illustrates a front view of an embodiment of pre-wired and pre-engineered integrated platform for power supply and distribution that has two or more cabinet enclosures and two or more UPSs mounted onto the skeletal framework.

FIG. 5 illustrates a front view of an embodiment of pre-wired and pre-engineered integrated platform for power supply and distribution that has two or more cabinet enclosures and two or more UPSs mounted onto the skeletal framework. The skeletal framework 40 and the cabinet enclosures 20 are fabricated in place prior to the modular power skid 10 being installed and all are installed as a monolithic, pre-wired, pre-assembled integrated platform.

The modular power skid 10 has a skeletal framework 40 that acts as an equipment support structure and as a cable routing support system. The skeletal framework 40 supports the weight of two or more cabinet enclosures 20 and two or more UPSs 30 mounted onto the skeletal framework 40. The two or more cabinet enclosures 20 at least include 1) a main power supply input breaker housed in a first cabinet enclosure mounted to the skeletal framework and 2) a power distribution output panel, housed in a second cabinet enclosure mounted to the skeletal framework, to supply to power electrical loads. Main and backup power supply wiring is laid out and routed along at least a portion of the skeletal framework 40 of the modular power skid 10 to and between at least one of the two or more of the cabinet enclosures 20 mounted onto the skeletal framework 40. Electrical connections between the two or more cabinets 20 may be internally connected via bus bars as switchgear cabinets.

The skeletal framework 40 of the modular power skid 10 has top and bottom rails run substantially parallel to each other with diagonal cross bars connecting the top and bottom rails to form the skeletal framework 40 of the modular power skid 10. Some irregular patterned horizontal surfaces and structures may be formed in the rails on top of the framework to better facilitate mounting the cabinets and UPSs. The skeletal framework 40 has a top horizontal surface to which one or more of the cabinet enclosures 20 mount to the above rails.

The uninterruptible power supply (UPS) cabinets 30 are mounted in a back to back arrangement for the main UPS in the third cabinet enclosure and the backup UPS in the fourth cabinet. The UPSs cabinets 30 are mounted on the skeletal framework 40.

The pre-wired and pre-engineered modular power skid has its skeletal framework configured to act as an equipment support structure as well as a cable routing support system. Another embodiment provides that each cabinet 20, 30 enclosure including the UPSs 30 are fastened and torqued to a topside of the top horizontal surface of the framework.

Both UPSs are 30 mounted back to back and the series of electrical cabinets 20 connect side-by-side and mount onto the structural frame 40 of the modular power skid 10. The series of electrical cabinets 20 are close coupled side-by-side when mounted onto the support frame 40 of the modular power skid 10. The switchgear cabinets 20 mechanically and electrically interconnect via the electrical bus bars through the sides of the cabinets 20 to form the switchgear cabinet, rather than connecting between the cabinets 20 with electrical conduits and wires routed underneath each cabinet 20. Note, some conduits and wires can be routed on or under the framework but the bus bars route through the sides of the cabinets.

Figure 6A:
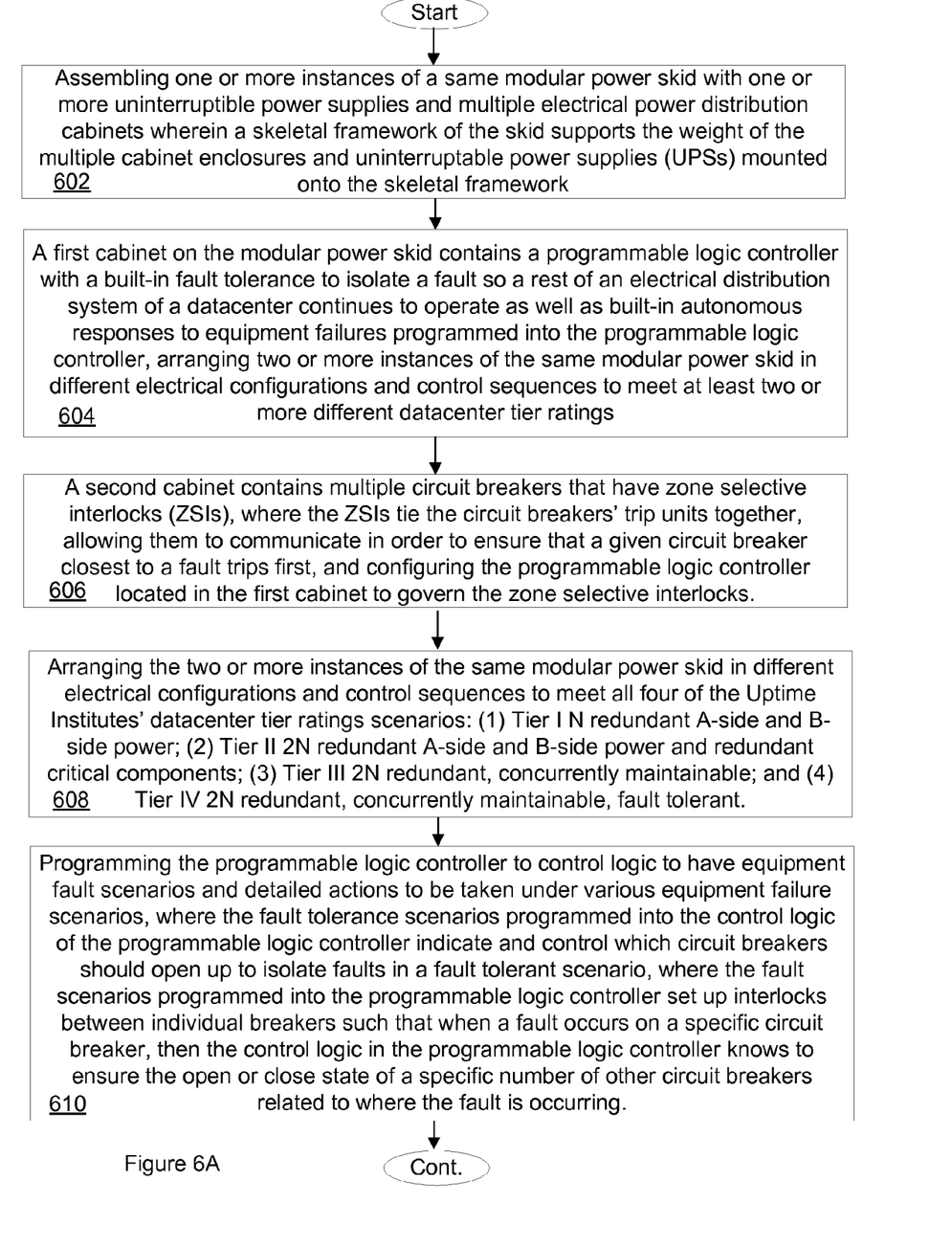

FIGS. 6A-C illustrate a flow diagram of an embodiment of constructing a single integrated platform assembled with different electrical cabinets and components mounted on the framework of the integrated platform that can be operated and arranged to meet multiple datacenter tier ratings. Steps 602-620 show an example embodiment, to which many variations and changes may be made as discussed herein. Also, the steps, where logically possible, may be performed out of the listed order.

In one embodiment, the software used to facilitate the algorithms discussed herein can be embodied onto a non-transitory machine-readable medium. A machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

What is claimed is:

1. An apparatus, comprising:
one or more instances of a same modular power skid assembled with one or more uninterruptible power supplies and multiple electrical power distribution cabinets wherein a skeletal framework of the skid supports a weight of the multiple electrical power distribution cabinet enclosures and uninterruptible power supplies (UPSs) mounted onto the skeletal framework, wherein a first cabinet on the modular power skid contains a programmable logic controller with a built-in fault tolerance to isolate a fault so a rest of an electrical distribution system of a datacenter continues to operate as well as built-in autonomous responses to equipment failures programmed into the programmable logic controller, where two or more instances of the same modular power skid are arranged in different electrical configurations and control sequences to meet at least two or more different datacenter tier ratings, where a second cabinet contains multiple circuit breakers that have zone selective interlocks (ZSIs), where the ZSIs tie the circuit breakers' trip units together, allowing them to communicate in order to ensure that a given circuit breaker closest to the fault trips first, and the programmable logic controller located in the first cabinet is configured to govern the zone selective interlocks.

2. The apparatus of claim 1, where the two or more instances of the same modular power skid are arranged in the different electrical configurations and the control sequences to meet all four of an Uptime Institutes' datacenter tier ratings scenarios: (1) Tier I N redundant A-side and B-side power; (2) Tier II 2N redundant A-side and B-side power and redundant critical components; (3) Tier III 2N redundant, concurrently maintainable; and (4) Tier IV 2N redundant, concurrently maintainable, fault tolerant.

3. The apparatus of claim 1, where the programmable logic controller has an input-output rack that has control wires that connect to each breaker in the system as well as each major component including a main and backup interruptible power supplies, where the programmable logic controller is programmed to monitor a status of each of these individual components in the electrical distribution system in order to control any operations and give the built-in fault tolerance to the electrical distribution system via opening and closing individual circuit breakers as well as starting up or shutting down external AC power diesel generators connecting to cabinets on the power skid, where a same instance of the modular power skid is able to work across multiple tier ratings via control wiring connected to each component for monitoring equipment failure and operational status and the programming in the programmable logic controller understanding the multiple tier ratings and which fault tolerance scenario to apply depending on a tier rating installation.

4. The apparatus of claim 3, where the programmable logic controller is programmed to monitor statuses of any individual components including the circuit breakers, the uninterruptible power supplies, the external AC power diesel generators, a main power from a utility power grid, then the programmable logic controller knows exactly both when and where the fault is occurring on including whether on an A-side/primary power to the electrical loads or a B-side/redundant power to the electrical loads of the datacenter, where the programmable logic controller talks to any intelligence in the uninterruptible power supplies to find out the status of the uninterruptible power supply, where the programmable logic controller monitors the 1) breakers' status of each AC power diesel generator, 2) breakers' status of the utility power grid input supply breaker to the datacenter and 3) breakers' status of each of any individual local breakers throughout the electrical distribution system.

5. The apparatus of claim 1, where the programmable logic controller is programmed to control logic to have equipment fault scenarios and detailed actions to be taken under various equipment failure scenarios, where the fault tolerance scenarios programmed into the control logic of the programmable logic controller indicate and control which of the circuit breakers should open up to isolate faults in a fault tolerant scenario, where the fault scenarios programmed into the programmable logic controller set up interlocks between individual breakers such that when the fault occurs on a specific circuit breaker, then the control logic in the programmable logic controller knows to ensure an open or close state of a specific number of other circuit breakers related to where the fault is occurring.

6. The apparatus of claim 1, where a reserve AC power generator electrically couples into a first switchboard cabinet via a first circuit breaker on a first instance of the power distribution skid, where a main AC power from the utility power grid transformer electrically couples via a tap splitter into a second switchboard cabinet via a second circuit breaker on a first instance of the power distribution skid, where each universal power supply on the first instance of the power distribution skid has a battery configured to supply at least 5 minutes of critical power battery at a full load of 750 Kilowatts, where a main AC power generator electrically couples into a third switchboard cabinet via a third circuit breaker on a second instance of the power distribution skid, where the main AC power from the utility power grid transformer electrically couples via the tap splitter into a fourth switchboard cabinet via a fourth circuit breaker on a second instance of the power distribution skid, where each universal power supply on the second instance of the power distribution skid has a battery configured to supply at least five minutes of critical power battery at a full load of 750 Kilowatts, where the data center has electrical loads that receive tiered III power supplied to those loads in each datacenter hall.

7. The apparatus of claim 1, where a first AC power generator electrically couples into a first switchboard cabinet via a first circuit breaker on a first instance of the power distribution skid, where a main AC power from the utility power grid transformer electrically couples directly into a second switchboard cabinet via a second circuit breaker on a first instance of the power distribution skid, where each universal power supply on the first instance of the power distribution skid has a battery configured to supply at least five minutes of critical power battery at a full load of 750 Kilowatts, where a second AC power generator electrically couples into a third switchboard cabinet via a third circuit breaker on a second instance of the power distribution skid, where the main AC power from the utility power grid transformer electrically couples directly into a fourth switchboard cabinet via a fourth circuit breaker on a second instance of the power distribution skid, where each universal power supply on the second instance of the power distribution skid has a battery configured to supply at least 5 minutes of critical power battery at a full load of 750 Kilowatts, where the data center has electrical loads that receive tiered IV power supplied to those loads in each data center hall.

8. The apparatus of claim 1, where the programmable logic controller has at least the following fault tolerance and equipment failure scenarios programmed into its control logic to govern opening or closing circuit breakers in the cabinets of the multiple instances of the modular power skids, including 1) an automatic transfer sequence for a loss of utility grid power to the primary AC generator connected to either instance of the modular power skid; 2) an automatic transfer sequence for a loss of utility grid power to the reserve generator connected to a first instance of the modular power skid when a primary generator connected to the first instance of the modular power skid fails; 3) an automatic transfer sequence for a loss of utility power grid power connected to a first instance of the modular power skid over to the reserve generator connected to the first instance of the modular power skid when a primary generator connected to the first instance of the modular power skid is not available; 4) an automatic transfer sequence for a loss of a primary AC generator power connected to the first instance of the modular power skid over to the reserve AC generator connected to the first instance of the modular power skid when the primary generator fails while running; and 5) an automatic transfer sequence to the utility grid power feed connected to the first instance of the modular power skid when the reserve generator connected to the first instance of the modular power skid fails while running.

9. A method for an apparatus, comprising:
assembling one or more instances of a same modular power skid with one or more uninterruptible power supplies and multiple electrical power distribution cabinets wherein a skeletal framework of the skid supports a weight of the multiple cabinet enclosures and uninterruptible power supplies (UPSs) mounted onto the skeletal framework, wherein a first cabinet on the modular power skid contains a programmable logic controller with a built-in fault tolerance to isolate a fault so a rest of an electrical distribution system of a datacenter continues to operate as well as built-in autonomous responses to equipment failures programmed into the programmable logic controller, arranging two or more instances of the same modular power skid in different electrical configurations and control sequences to meet at least two or more different datacenter tier ratings, where a second cabinet contains multiple circuit breakers that have zone selective interlocks (ZSIs), where the ZSIs tie the circuit breakers' trip units together, allowing them to communicate in order to ensure that a given circuit breaker closest to a fault trips first, and configuring the programmable logic controller located in the first cabinet to govern the zone selective interlocks.

10. The method of claim 9, further comprising arranging the two or more instances of the same modular power skid in different electrical configurations and control sequences to meet all four of the Uptime Institutes' datacenter tier ratings scenarios: (1) Tier I N redundant A-side and B-side power; (2) Tier II 2N redundant A-side and B-side power and redundant critical components; (3) Tier III 2N redundant, concurrently maintainable; and (4) Tier IV 2N redundant, concurrently maintainable, fault tolerant.

11. The method of claim 9, further comprising connecting the programmable logic controller has an input-output rack that has control wires to each breaker in the system as well as each major component including a main and backup interruptible power supplies, programming the programmable logic controller to monitor a status of each of these individual components in the electrical distribution system in order to control any operations and give fault tolerance to the electrical distribution system by opening and closing individual circuit breakers as well as starting up or shutting down external AC power diesel generators connecting to cabinets on the power skid, where a same instance of the modular power skid is able to work across multiple tier ratings via control wiring connected to each component for monitoring equipment failure and operational status and the programming in the programmable logic controller understanding the multiple tier ratings and which fault tolerance scenario to apply depending on the tier rating installation.

12. The method of claim 11, further comprising programming the programmable logic controller to monitor the statuses of any individual components including the circuit breakers, the uninterruptible power supplies, the external AC power diesel generators, a main power from a utility power grid, then the programmable logic controller knows exactly both when and where the fault is occurring on including whether on an A-side/primary power to the electrical loads or a B-side/redundant power to the electrical loads of the datacenter, where the programmable logic controller talks to any intelligence in the uninterruptible power supplies to find out the status of the uninterruptible power supply, where the programmable logic controller monitors the 1) breakers' status of each AC power diesel generator, 2) breakers' status of the utility power grid input supply breaker to the datacenter and 3) breakers' status of each of any individual local breakers throughout the electrical distribution system.

13. The method of claim 9, further comprising programming the programmable logic controller to control logic to have equipment fault scenarios and detailed actions to be taken under various equipment failure scenarios, where the built-in fault tolerance scenarios programmed into the control logic of the programmable logic controller indicate and control which circuit breakers should open up to isolate faults in a fault tolerant scenario, where the fault scenarios programmed into the programmable logic controller set up interlocks between individual breakers such that when the fault occurs on a specific circuit breaker, then the control logic in the programmable logic controller knows to ensure an open or close state of a specific number of other circuit breakers related to where the fault is occurring.

14. The method of claim 9, further comprising electrically coupling a reserve AC power generator into a first switchboard cabinet via a first circuit breaker on a first instance of the power distribution skid, where a main AC power from a utility power grid transformer electrically couples via a tap splitter into a second switchboard cabinet via a second circuit breaker on a first instance of the power distribution skid, where each universal power supply on the first instance of the power distribution skid has a battery configured to supply at least 5 minutes of critical power battery at a full load of 750 Kilowatts, where a main AC power generator electrically couples into a third switchboard cabinet via a third circuit breaker on a second instance of the power distribution skid, where the main AC power from the utility power grid transformer electrically couples via the tap splitter into a fourth switchboard cabinet via a fourth circuit breaker on the second instance of the power distribution skid, where each universal power supply on the second instance of the power distribution skid has a battery configured to supply at least five minutes of critical power battery at a full load of 750 Kilowatts, where the datacenter has electrical loads that receive tiered III power supplied to those loads in each data center hall.

15. The method of claim 9, further comprising electrically coupling a first AC power generator into a first switchboard cabinet via a first circuit breaker on a first instance of the power distribution skid, where a main AC power from the utility power grid transformer electrically couples directly into a second switchboard cabinet via a second circuit breaker on a first instance of the power distribution skid, where each universal power supply on the first instance of the power distribution skid has a battery configured to supply at least five minutes of critical power battery at a full load of 750 Kilowatts, where a second AC power generator electrically couples into a third switchboard cabinet via a third circuit breaker on a second instance of the power distribution skid, where the main AC power from the utility power grid transformer electrically couples directly into a fourth switchboard cabinet via a fourth circuit breaker on a second instance of the power distribution skid, where each universal power supply on the second instance of the power distribution skid has a battery configured to supply at least 5 minutes of critical power battery at a full load of 750 Kilowatts, where the data center has electrical loads that receive tiered IV power supplied to those loads in each data center hall.

16. The method of claim 9, further comprising programming the programmable logic controller with at least the following fault tolerance and equipment failure scenarios into its control logic to govern opening or closing circuit breakers in the cabinets of the multiple instances of the modular power skids, including 1) an automatic transfer sequence for a loss of utility grid power to the primary AC generator connected to either instance of the modular power skid; 2) an automatic transfer sequence for a loss of utility grid power to the reserve generator connected to a first instance of the modular power skid when a primary generator connected to the first instance of the modular power skid fails; 3) an automatic transfer sequence for a loss of utility power grid power connected to a first instance of the modular power skid over to the reserve generator connected to the first instance of the modular power skid when a primary generator connected to the first instance of the modular power skid is not available; 4) an automatic transfer sequence for a loss of a primary AC generator power connected to the first instance of the modular power skid over to the reserve AC generator connected to the first instance of the modular power skid when the primary generator fails while running; and 5) an automatic transfer sequence to the utility grid power feed connected to the first instance of the modular power skid when the reserve generator connected to the first instance of the modular power skid fails while running.

\* \* \* \* \*